United States Patent
Honjo et al.

(10) Patent No.: US 7,887,768 B2
(45) Date of Patent: Feb. 15, 2011

(54) AIR POLLUTION CONTROL APPARATUS AND AIR POLLUTION CONTROL METHOD

(75) Inventors: Shintaro Honjo, Hiroshima (JP);
Katsumi Nochi, Hiroshima (JP);
Yoshiaki Obayashi, Hiroshima (JP);
Masashi Kiyosawa, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/522,044

(22) PCT Filed: Jul. 18, 2007

(86) PCT No.: PCT/JP2007/064183

§ 371 (c)(1),
(2), (4) Date: Jul. 2, 2009

(87) PCT Pub. No.: WO2008/111240

PCT Pub. Date: Sep. 18, 2008

(65) Prior Publication Data

US 2010/0074818 A1    Mar. 25, 2010

(30) Foreign Application Priority Data

Mar. 9, 2007    (JP) .............................. 2007-060729

(51) Int. Cl.
*B01D 53/56* (2006.01)
*B01D 53/64* (2006.01)
*B01D 53/74* (2006.01)

(52) U.S. Cl. .................... 423/210; 423/239.1; 422/168; 422/177

(58) Field of Classification Search ................. 423/210, 423/239.1; 422/168, 177
See application file for complete search history.

(56) References Cited

U.S. PATENT DOCUMENTS

2003/0185718 A1    10/2003    Sellakumar
2004/0202596 A1    10/2004    Honjo et al.

(Continued)

FOREIGN PATENT DOCUMENTS

JP    56-058522 A    5/1981

(Continued)

OTHER PUBLICATIONS

International Search Report of PCT/JP2007/064183, Mailing Date of Oct. 30, 2007.

*Primary Examiner*—Timothy C Vanoy
(74) *Attorney, Agent, or Firm*—Westerman, Hattori, Daniels & Adrian, LLP

(57) ABSTRACT

An air pollution control apparatus according to the present invention reduces nitrogen oxides and oxidizes mercury in flue gas 16 discharged from a boiler by an ammonia denitrating catalyst. The air pollution control apparatus includes an economizer bypassing unit 15a that diverts high-temperature combustion gas 11 to a downstream side while bypassing an economizer 15 provided in a gas flue 10a for combustion gas 11 from the boiler, provided with an ammonium-chloride supply unit 101 that supplies powdery ammonium chloride ($NH_4Cl$) to the economizer bypassing unit 15a. The air pollution control apparatus sublimates the ammonium chloride in an atmosphere at a high temperature of the combustion gas 11, and supplies hydrogen chloride and ammonium into the flue gas flue 102.

7 Claims, 5 Drawing Sheets

U.S. PATENT DOCUMENTS

| | | | |
|---|---|---|---|
| 2007/0160517 A1* | 7/2007 | Fan et al. | 423/210 |
| 2007/0202020 A1* | 8/2007 | Honjo et al. | 422/177 |
| 2008/0138264 A1* | 6/2008 | Honjo et al. | 423/210 |
| 2008/0193351 A9* | 8/2008 | Boardman et al. | 423/210 |

FOREIGN PATENT DOCUMENTS

| | | |
|---|---|---|
| JP | 61-185320 A | 8/1986 |
| JP | 02-241520 A | 9/1990 |
| JP | 10-230137 A | 9/1998 |
| JP | 2004-313833 A | 11/2004 |
| JP | 2005-519732 T | 7/2005 |
| WO | 03/076051 A1 | 9/2003 |

* cited by examiner

AIR POLLUTION CONTROL APPARATUS AND AIR POLLUTION CONTROL METHOD

TECHNICAL FIELD

The present invention relates to an air pollution control apparatus and an air pollution control method.

BACKGROUND ART

FIG. 5 is a schematic diagram of an air pollution control apparatus of a coal combustion boiler. As shown in FIG. 5, combustion gas 11 generates steam in a generating tube within a furnace 12 of a coal combustion boiler 10 (the generated steam is separated into gas and liquid by a steam drum 13, the steam is guided into a super heater 14 and becomes overheated steam, the steam is used for driving a steam turbine, and then condensed water is circulated into a water tube in the furnace 12 and is again evaporated). The steam is overheated by the super heater 14 to heat water to be supplied to the coal combustion boiler 10 in an economizer 15, and then the steam is discharged from an exit of the economizer 15 as flue gas 16. The flue gas 16 from the economizer 15 is supplied to a denitrator 17, heats air 19 by heat exchange in an air heater 18, is supplied to a dust collector 20, is further supplied to a desulfurizer 21, and then is discharged to atmosphere as purge gas 22.

As the denitrator 17, one is proposed which sprays ammonium ($NH_3$) to the flue gas 16 from the coal combustion boiler 10 upstream of the denitrator (catalyst unit), thereby reducing and denitrating the flue gas 16.

To reduce mercury included in flue gas, a system is proposed that sprays a chlorinating agent such as HCl upstream of the denitrator 17, oxidizes (chlorinates) the mercury on a catalyst, and reduces the mercury by a wet desulfurizer installed downstream (Patent Document 1).

Patent Document 1: Japanese Patent Application Laid-open No. H10-230137

DISCLOSURE OF INVENTION

Problem to be Solved by the Invention

In a power plant where a boiler device is installed, it is necessary to strictly store ammonia and HCl as hazardous materials, and further HCl has high corrosiveness. Therefore, there is a problem that high costs are needed to manage these materials and to take measures against corrosiveness.

To supply $NH_3$ and HCl into a flue, a vaporizer and a spray grid are required for each of them to enhance the supply efficiency.

High-temperature heat source and steam are also required to evaporate HCl.

The advent of an air pollution control apparatus capable of easy storage, in which efficiency in removing nitrogen oxides and mercury is not deteriorated is desired as measures for flue gas.

In view of the above problem, it is an object of the present invention to provide an air pollution control apparatus and an air pollution control method capable of easy storage, in which the efficiency in removing nitrogen oxides and mercury is not deteriorated, as the measures for flue gas.

Means for Solving Problem

According to an aspect of the present invention, an air pollution control apparatus that reduces nitrogen oxides and oxidizes mercury in flue gas from a boiler by using an ammonia denitrating catalyst includes: an ammonium-chloride supply unit that supplies powdery ammonium chloride to a location near an entrance of an economizer provided in a flue of the boiler or to an economizer bypassing unit, or both of them. The supplied powdery ammonium chloride is sublimated by combustion gas, and hydrogen chloride and ammonium are supplied into the flue.

Advantageously, in the air pollution control apparatus, a particle diameter of the powdery ammonium chloride is 0.25 millimeter or less.

Advantageously, in the air pollution control apparatus, any one of an HCl supply unit and an $NH_3$ supply unit, or both of them are provided downstream of the economizer.

Advantageously, in the air pollution control apparatus, the ammonium chloride supply unit includes a crushing unit that crushes solid ammonium chloride.

Advantageously, the air pollution control apparatus further includes a vaporizer that heats and vaporizes the ammonium chloride supplied from the ammonium-chloride supply unit.

Advantageously, the air pollution control apparatus further includes a vaporizer that heats and vaporizes the ammonium-chloride supplied from the ammonium-chloride supply unit, and a particle diameter of the powdery ammonium chloride is 0.25 millimeter or less.

According to another aspect of the present invention, an air pollution control method for reducing nitrogen oxides and oxidizing mercury in flue gas from a boiler by using an ammonia denitrating catalyst includes: supplying powdery ammonium chloride to a location near an entrance of an economizer provided in a flue of a boiler or to an economizer bypassing unit, or both of them; sublimating the ammonium chloride in an atmosphere at a temperature of combustion gas at a supply location; and supplying hydrogen chloride and ammonium into the flue.

Effect of the Invention

According to the present invention, in the economizer or its bypassing unit of a boiler device through which high-temperature combustion gas passes, HCl and $NH_3$ are vaporized by the high-temperature (550 to 650° C.) combustion gas by adding the powdery ammonium chloride ($NH_4Cl$). With this configuration, it is possible to omit the vaporizer, the steam grid, and the storage tank in which liquid HCl and $NH_3$ are stored, which are used in the conventional technique.

| EXPLANATIONS OF LETTERS OR NUMERALS | |
|---|---|
| 10 | coal combustion boiler |
| 11, 11a | combustion gas |
| 12 | furnace |
| 13 | steam drum |
| 14 | super heater |
| 15 | economizer |
| 15a | economizer bypassing unit |
| 16 | flue gas |
| 17 | denitrator |

BEST MODE(S) FOR CARRYING OUT THE INVENTION

The present invention is explained below in detail with reference to the accompanying drawings. The present invention is not limited thereto. In addition, constituent elements in the following embodiments include those that can be easily assumed by those skilled in the art or that are substantially equivalent.

First Embodiment

An air pollution control apparatus according to a first embodiment of the present invention will be explained with reference to the drawings.

Figure 1:
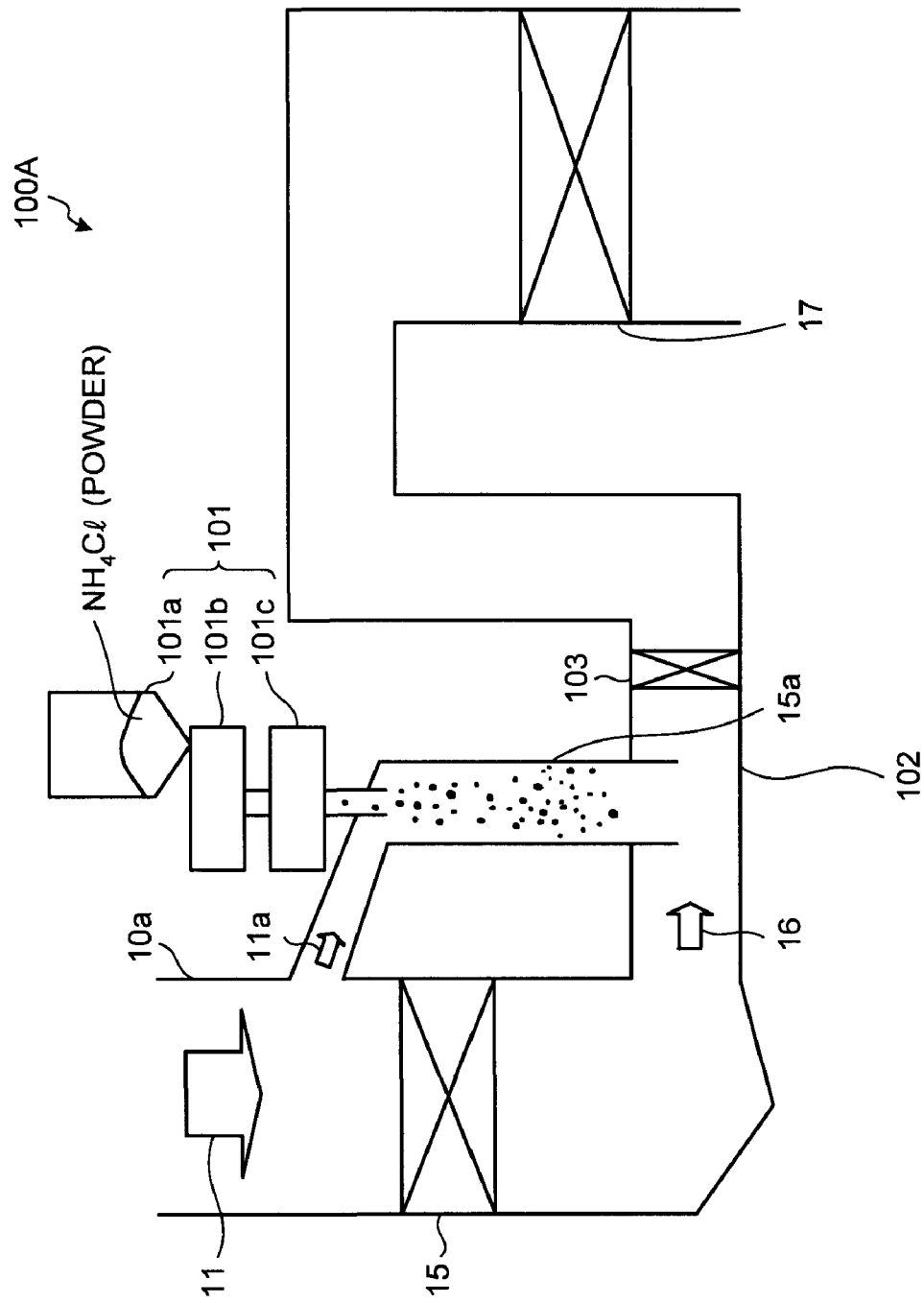
FIG. 1 is a schematic diagram of an air pollution control apparatus according to a first embodiment of the present invention.
Figure 5:
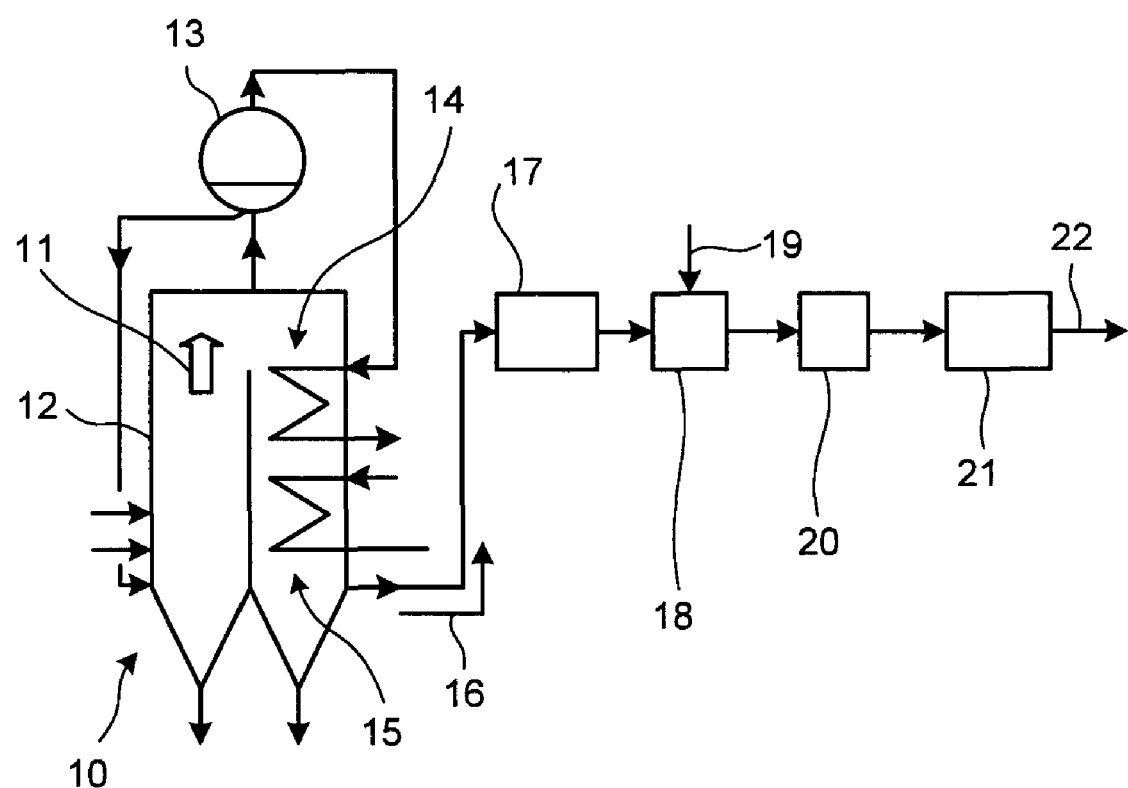
FIG. 5 is a schematic diagram of an air pollution control apparatus of a coal combustion boiler.

FIG. 1 is a schematic diagram of the air pollution control apparatus according to the first embodiment. In FIG. 1, the boiler system shown in FIG. 5 and a boiler system of the present invention are the same, and FIG. 1 depicts only a portion from a boiler to a denitrator. Like members are denoted by like reference numerals, and explanations thereof will be omitted.

As shown in FIG. 1, an air pollution control apparatus 100A according to the first embodiment reduces nitrogen oxides and mercury in the flue gas 16 discharged from a boiler (not shown) by an ammonia denitrating catalyst. The air pollution control apparatus 100A includes an economizer bypassing unit 15a that diverts high-temperature combustion gas 11 to a downstream side while bypassing the economizer 15 provided in a gas flue 10a for the combustion gas 11 from the boiler, provided with an ammonium-chloride supply unit 101 that supplies powdery ammonium chloride ($NH_4Cl$) to the economizer bypassing unit 15a. The air pollution control apparatus 100A sublimates the ammonium chloride in an atmosphere at a high temperature of the combustion gas 11, and supplies hydrogen chloride and ammonium into a flue 102.

Reference numeral 103 denotes a mixer that mixes hydrogen chloride (HCl) and ammonium ($NH_3$) supplied into the flue gas 16.

With this configuration, $NH_4Cl$ powder is sprayed to the economizer bypassing unit 15a, sublimated by high-temperature combustion gas 11a (550 to 650° C.) that passes through the economizer bypassing unit 15a, and supplied as HCl and $NH_3$ to the flue 102 for the flue gas 16 with which the bypassing unit is in communication.

In the boiler device, concentration of nitrogen oxides is varied. In such a case, urea (($H_2N)_2C$=O) can be sprayed together with ammonium chloride to increase the supply of ammonia.

In the first embodiment, the ammonium-chloride supply unit 101 that supplies the ammonium chloride ($NH_4Cl$) into the economizer bypassing unit 15a includes a silo 101a that temporarily stores the powdery ammonium chloride therein, a feeder 101b that supplies the stored ammonium chloride to a crusher 101c by a predetermined amount, and the crusher 101c that crushes the supplied ammonium chloride into a predetermined particle diameter.

Because the sublimation of $NH_4Cl$ is an endothermic reaction, it is preferable that the temperature is higher. Thus, in the first embodiment, at the same time the $NH_4Cl$ powder is supplied from the silo 101a by the feeder 101b, the crusher 101c is connected to crush the powder into fine particles so that the particles can easily be sublimated. The supply amount can be adjusted by the feeder 101b, and controlled by an exit NOx monitor or Hg monitor. When the powdery ammonium chloride has the predetermined particle diameter or less, it is unnecessary to install the crusher 101c.

Because the predetermined particle diameter of the ammonium chloride relates to a gas flow rate of the combustion gas 11, it is necessary to determine the predetermined particle diameter according to the flow rate. For example, when a residence time of the combustion gas 11a that passes through the economizer bypassing unit 15a is five seconds or less, it is preferable that the particle diameter of the ammonium chloride is 0.25 millimeter or less, and more preferably 0.2 millimeter or less.

$NH_3$ decomposed by the ammonium chloride is used for reducing and denitrating NOx by the denitrator 17, and HCl is used for oxidizing mercury, thereby reducing nitrogen oxides and mercury from the flue gas. The ammonium chloride can be charged into the boiler with a high temperature. However, because there is a possibility that $NH_3$ is decomposed when the temperature is equal to or higher than its spontaneous ignition temperature of 651° C., it is necessary that the temperature thereof be 650° C. or lower.

Figure 2:
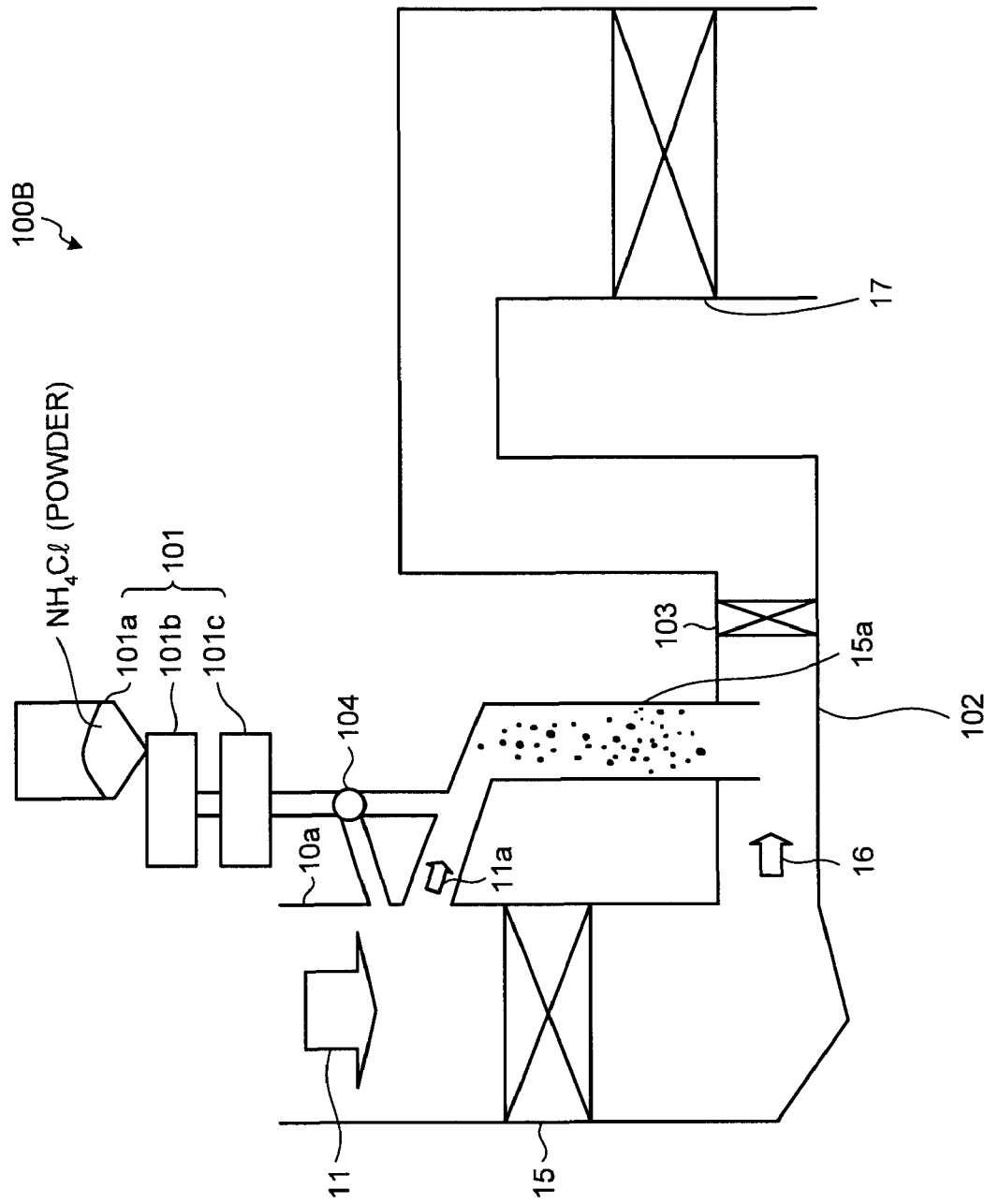
FIG. 2 is a schematic diagram of another air pollution control apparatus according to the first embodiment.

As shown with an air pollution control apparatus 100B in FIG. 2, the powdery ammonium chloride can be supplied to a location close to an entrance of the economizer 15.

A switching unit 104 is provided so that the powdery ammonium chloride can be appropriately supplied to any one of the location close to the entrance of the economizer 15 and the economizer bypassing unit 15a, or both thereof.

For example, when the residence time of the combustion gas 11 passing through the economizer 15 is two seconds or less, it is preferable that the particle diameter of the ammonium chloride be 0.15 millimeter or less, and more preferably 0.1 millimeter or less.

The concentrations of $NH_3$ and HCl in the flue 102 for the flue gas 16 are set such that a $NH_3$/NOx molar ratio with respect to an NOx concentration of the flue gas 16 becomes 1 or less according to required denitration performance, and $NH_3$ and HCl can be sprayed such that the concentrations become several tens to several hundreds ppm, preferably several tens to 200 ppm.

The amount of the combustion gas 11 that passes through the economizer bypassing unit 15a is usually about several percent of the entire combustion gas 11. Therefore, it is preferable that the concentrations of $NH_3$ and HCl in the economizer bypassing unit 15a is in a range of about 0.1 to several percent. This is because, when the concentrations are so high, the cost is increased and the cost efficiency is deteriorated. It is preferable that the Hg concentration of the flue gas be in a range of 0.1 to several tens μg/m³N, and is 1/1000 or less in the molar ratio with respect to the HCl concentration in the flue gas.

In the economizer bypassing unit 15a of the boiler device through which the high-temperature combustion gas 11 upstream of the denitrator 17 having the ammonia denitrating catalyst passes, HCl and $NH_3$ are vaporized by the high-temperature (550 to 650° C.) combustion gas 11 that passes through the economizer bypassing unit 15a by adding the powdery ammonium chloride ($NH_4Cl$). Therefore, the vaporizer, the spray grid, and the storage tank that stores therein liquid HCl and $NH_3$ can be omitted, unlike the conventional technique.

As described above, according to the present invention, the HCl and $NH_3$ vaporizer, the spray grid and the storage tank can be omitted. In addition, because the powdery ammonium chloride ($NH_4Cl$) is neutral salt and it is easy to handle the neutral salt, it is possible to largely reduce the costs required for legal permission and authorization for HCl and $NH_3$ which are both hazardous materials, as well as the plant cost concerning safety management measures.

Because the combustion gas 11a that passes through the economizer bypassing unit 15a is used as a heat source for sublimation, another heat source is unnecessary. Because the temperature is higher (550° C.) than the temperature of a denitrating catalyst (350 to 420° C.) near upstream of the conventional denitrating catalyst apparatus, the sublimation rate is high, the required residence time can be shortened and thus, any additional sublimation equipment is not necessary.

Because the sublimation rate can be further increased by crushing the ammonium chloride powder using the crusher 101c as needed, it is possible to prevent non-sublimated ammonium chloride from remaining or accumulating.

It is less expensive to supply the ammonium chloride alone as compared with the agent costs of HCl and $NH_3$, which are separately supplied in the conventional technique, and the operation cost for a long term can be reduced.

Second Embodiment

An air pollution control apparatus according to a second embodiment of the present invention will be explained with reference to the drawings.

Figure 3:
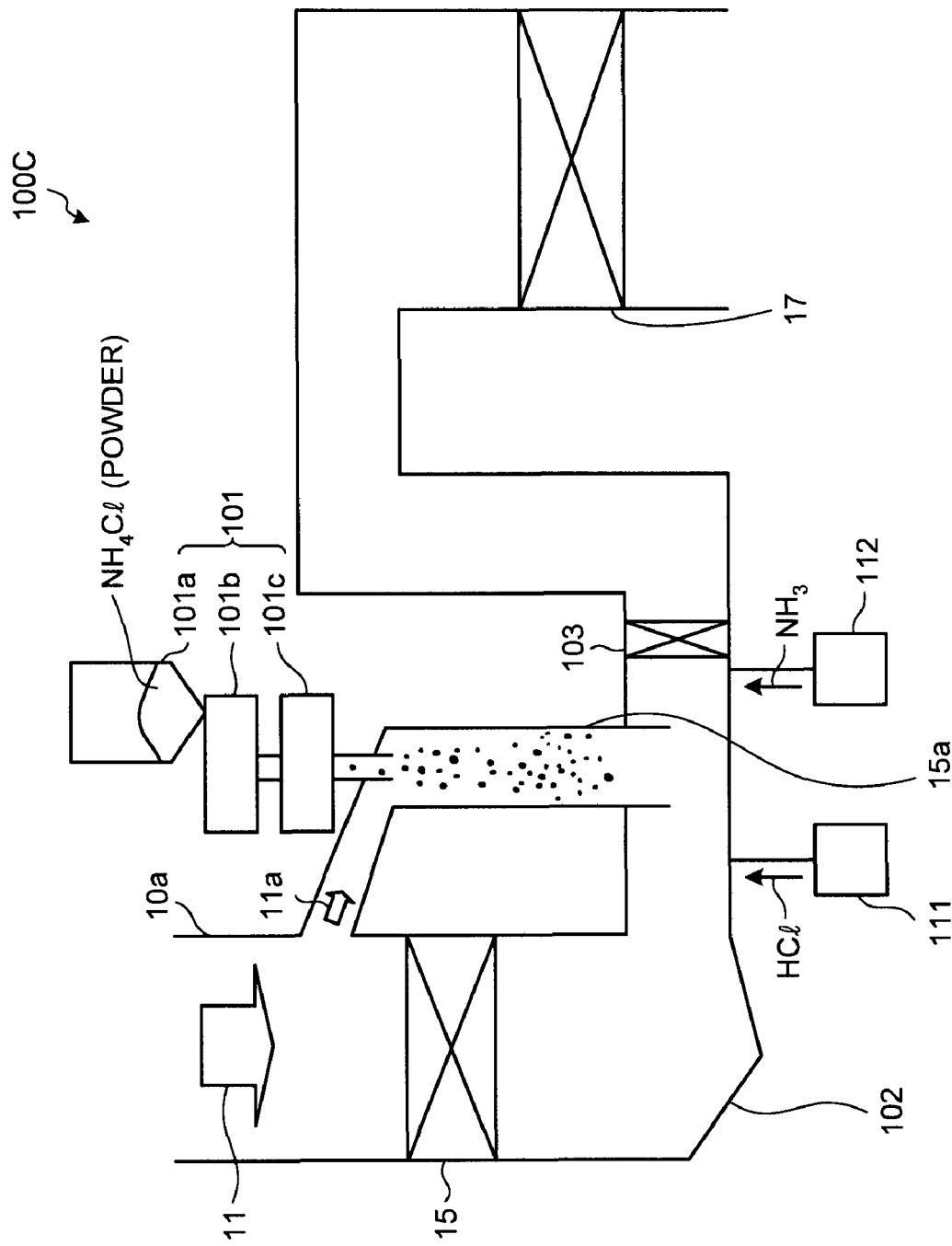
FIG. 3 is a schematic diagram of an air pollution control apparatus according to a second embodiment of the present invention.

FIG. 3 is a schematic diagram of the air pollution control apparatus according to the second embodiment. The same members as those of the air pollution control apparatus shown in FIG. 1 are denoted by the same reference numerals, and explanations thereof will be omitted.

As shown in FIG. 3, an air pollution control apparatus 100C according to the second embodiment includes an HCl supply unit 111 that supplies HCl and an $NH_3$ supply unit 112 that supplies $NH_3$, to the flue 102 for the flue gas 16.

When the balance of the concentrations of nitrogen oxides and mercury in the flue gas discharged from a combustion device such as a boiler is different from a normal balance, a necessary amount of hydrochloric acid or ammonium is supplied into the flue 102 to respond to the balance.

For example, when necessary HCl is greater than necessary $NH_3$, HCl is sprayed from the HCl supply unit 111 and the ammonium chloride is sprayed.

On the other hand, when the necessary $NH_3$ is smaller than the necessary HCl, $NH_3$ is sprayed from the $NH_3$ supply unit 112 and the ammonium chloride is sprayed.

At this time, urea ($(H_2N)_2C=O$) can be sprayed instead of ammonia.

With this configuration, because ammonia and hydrogen chloride are separately supplied in the second embodiment, even if the concentration of nitrogen oxides or mercury in the flue gas 16 is varied, an appropriate operation can be taken.

Third Embodiment

An air pollution control apparatus according to a third embodiment of the present invention will be explained with reference to the drawings.

Figure 4:
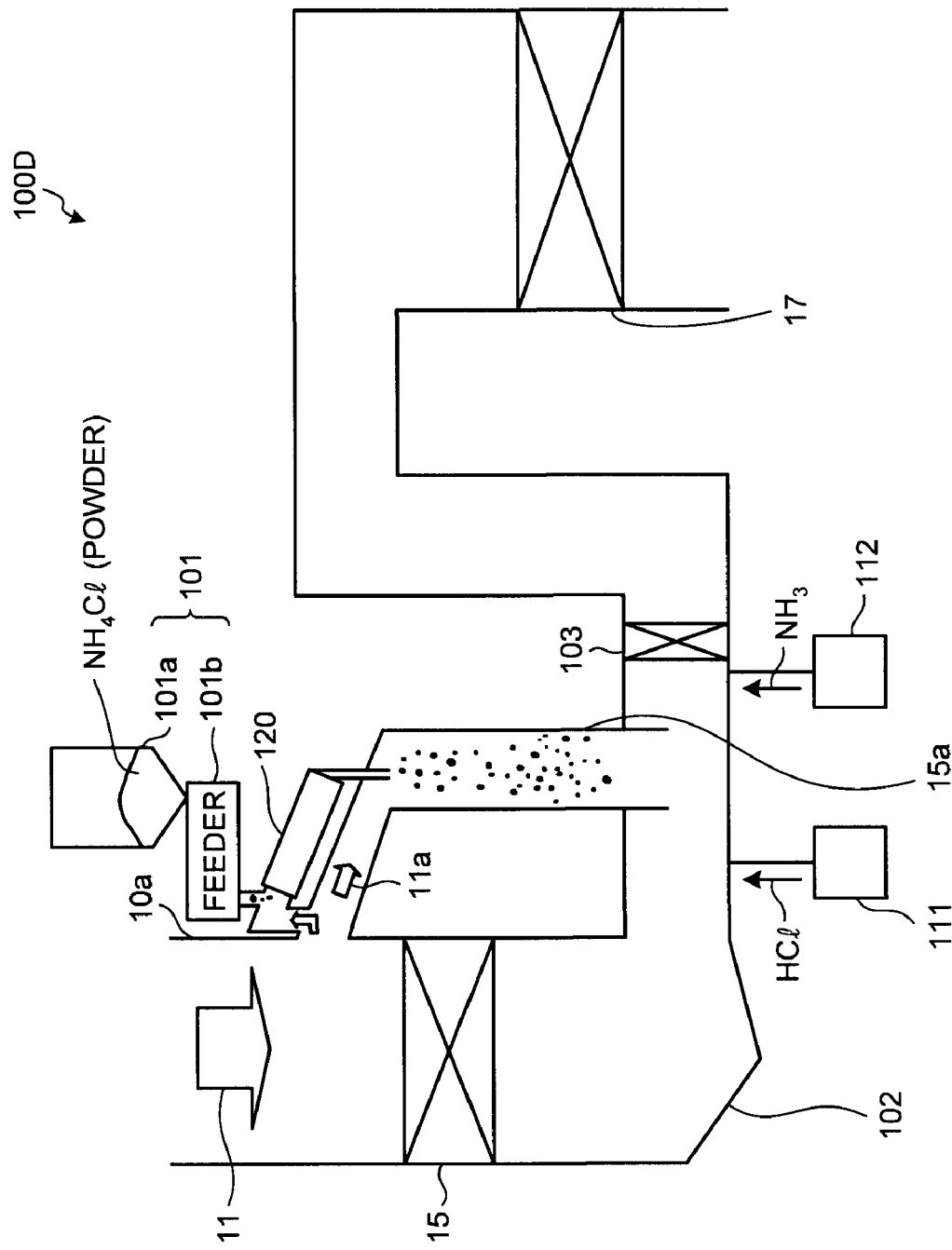
FIG. 4 is a schematic diagram of an air pollution control apparatus according to a third embodiment of the present invention.

FIG. 4 is a schematic diagram of the air pollution control apparatus according to the third embodiment. The same members as those of the air pollution control apparatus shown in FIGS. 1 and 3 are denoted by the same reference numerals, and explanations thereof will be omitted.

As shown in FIG. 4, an air pollution control apparatus 100D according to the third embodiment includes a rotary dryer (or rotary kiln) 120 as an evaporation unit that heats and evaporates the ammonium chloride supplied by the feeder 101b, for example.

Because the rotary dryer 120 is provided, the heating and evaporating operations for $NH_4Cl$ are facilitated, and it is possible to reliably sublimate and supply HCl and $NH_3$ into the flue.

The sublimation step can be divided into two steps by using the rotary dryer 120 in this manner, and it is possible to more reliably vaporize the ammonium chloride, and to reliably prevent the powder from remaining.

TEST EXAMPLES 1 to 4

Tests were conducted using the air pollution control apparatus 100C shown in FIG. 3.

The amount of the combustion gas 11 from the boiler furnace is 2,400,000 $Nm^3/h$, the temperature of the combustion gas 11 at the entrance of the economizer is 600° C., and 24,000 $Nm^3/h$ corresponding to 1% of the combustion gas 11 is diverted into the economizer bypassing unit 15a.

Test Example 1

In a test example 1, an NOx concentration at the entrance of the denitrator (SCR) 17 is 167 ppm, and a mercury concentration ($Hg^0$) is 8 $\mu g/m^3N$.

By supplying the powdery ammonium chloride by 875 kg/h, an $NH_3$ supply concentration at the entrance of the denitrator (SCR) 17 is 150 ppm, an HCl supply concentration at the entrance of the denitrator (SCR) 17 is 150 ppm, the denitration ratio is 90%, and a mercury oxidation ratio is 97%.

These results are shown in Table 1.

TABLE 1

|  |  | Test example 1 | Test example 2 | Test example 3 | Test example 4 |
| --- | --- | --- | --- | --- | --- |
| Flue gas amount | $M^3N/h$ | 2,400,000 | 2,400,000 | 2,400,000 | 2,400,000 |
| Flue gas temperature at economizer entrance | C.° | 600 | 600 | 600 | 600 |
| Amount of gas bypassing economizer | $M^3N/h$ | 24,000 | 24,000 | 24,000 | 24,000 |
| $NH_4Cl$ supply amount | Kg/h | 875 | 875 | 875 | 420 |
| $NH_3$ supply amount | Kg/h | 0 | 319 | 0 | 0 |
| Urea supply amount | Kg/h | 0 | 0 | 530 | 0 |
| HCl supply amount | Kg/h | 0 | 0 | 0 | 304 |

TABLE 1-continued

|  |  | Test example 1 | Test example 2 | Test example 3 | Test example 4 |
|---|---|---|---|---|---|
| $NH_3$ concentration at entrance of denitrator | Ppm | 150 | 315 | 315 | 72 |
| HCl concentration at entrance of denitrator | Ppm | 150 | 150 | 150 | 150 |
| NOx concentration at entrance of denitrator | Ppm | 167 | 350 | 350 | 80 |
| $NH_3$/NOx ratio | — | — | 0.9 | 0.9 | 0.9 |
| Temperature at entrance of denitrator | C. ° | 370 | 370 | 370 | 370 |
| $Hg^0$ concentration at entrance of denitrator | $\mu g/m^3 N$ | 8 | 8 | 8 | 8 |
| $Hg^{2+}$ concentration at entrance of denitrator | $\mu g/m^3 N$ | 2 | 2 | 2 | 2 |
| $Hg^0$ concentration at exit of denitrator | $\mu g/m^3 N$ | 0.24 | 0.4 | 0.4 | 0.16 |
| $Hg^{2+}$ concentration at exit of denitrator | $\mu g/m^3 N$ | 9.76 | 9.6 | 9.6 | 9.84 |
| $Hg^0$ oxidation ratio | % | 97 | 95 | 95 | 98 |
| Denitration ratio | % | 90 | 90 | 90 | 90 |

Test Example 2

In a test example 2, the NOx concentration at the entrance of the denitrator (SCR) 17 is increased as high as 350 ppm. The mercury concentration ($Hg^0$) is the same and is 8 $\mu g/m^3 N$.

When the powdery ammonium chloride is supplied by 875 kg/h and ammonia is supplied into the flue 102 by 319 kg/h, the $NH_3$ supply concentration at the entrance of the denitrator (SCR) 17 became 315 ppm, the HCl supply concentration at the entrance of the denitrator (SCR) 17 became 150 ppm, the denitration ratio is 90%, and the mercury oxidation ratio is 95%.

In the test example 2, because the nitrogen oxides concentration is high, the mercy oxidation ratio is slightly reduced.

Test Example 3

In a test example 3, the NOx concentration at the entrance of the denitrator (SCR) 17 is increased as high as 350 ppm. The mercury concentration ($Hg^0$) is the same and is 8 $\mu g/m^3 N$.

The powdery ammonium chloride is supplied by 875 kg/h, and urea is supplied into the flue gas flue 102 by 530 kg/h. With this configuration, the $NH_3$ supply concentration at the entrance of the denitrator (SCR) 17 became 315 ppm, the HCl supply concentration at the entrance of the denitrator (SCR) 17 became 150 ppm, the denitration ratio is 90%, and the mercury oxidation ratio is 95%.

Even if the urea is supplied instead of separately supplying the ammonia, the denitration ratio is not reduced. In the test example 3 also, because the concentration of nitrogen oxides is high, the mercury oxidation ratio was slightly reduced.

Test Example 4

In a test example 4, the NOx concentration at the entrance of the denitrator (SCR) 17 is reduced as low as 80 ppm. The mercury concentration ($Hg^0$) is the same and is 8 $\mu g/m^3 N$.

The powdery ammonium chloride is supplied by 420 kg/h and HCl is supplied by 304 kg/h. With this configuration, the $NH_3$ supply concentration at the entrance of the denitrator (SCR) 17 became 72 ppm, the HCl supply concentration at the entrance of the denitrator (SCR) 17 became 150 ppm, the denitration ratio is 90%, and the mercury oxidation ratio is 98%.

In the test example 4, because the nitrogen oxides concentration is low, the mercury oxidation ratio is enhanced.

INDUSTRIAL APPLICABILITY

By adding the powdery ammonium chloride ($NH_4Cl$) according to the present invention as described above, HCl and $NH_3$ are evaporated by high-temperature (550 to 650° C.) combustion gas passing through the economizer or the economizer bypassing unit. With this configuration, omission of constituent elements in air pollution control apparatus can be achieve

The invention claimed is:

1. An air pollution control apparatus that reduces nitrogen oxides and oxidizes mercury in flue gas from a boiler by using an ammonia denitrating catalyst, the air pollution control apparatus comprising:
   an ammonium-chloride supply unit that supplies powdery ammonium chloride to a location near an entrance of an economizer provided in a flue of the boiler or to an economizer bypassing unit, or both of them, wherein
   the supplied powdery ammonium chloride is sublimated by combustion gas, and a hydrogen chloride supply unit for supplying hydrogen chloride into the flue and an ammonium supply unit for supplying ammonium into the flue are provided.

2. The air pollution control apparatus according to claim 1, wherein a particle diameter of the powdery ammonium chloride is 0.25 millimeter or less.

3. The air pollution control apparatus according to claim 1, wherein any one of an HCl supply unit and an $NH_3$ supply unit, or both of them are provided downstream of the economizer.

4. The air pollution control apparatus according to claim 1, wherein the ammonium-chloride supply unit includes a crushing unit that crushes solid ammonium chloride.

5. The air pollution control apparatus according to claim 1, further comprising a vaporizer that heats and vaporizes the ammonium chloride supplied from the ammonium-chloride supply unit.

6. The air pollution control apparatus according to claim 1, further comprising a vaporizer that heats and vaporizes the ammonium chloride supplied from the ammonium-chloride supply unit, wherein a particle diameter of the powdery ammonium chloride is 0.25 millimeter or less.

7. An air pollution control method for reducing nitrogen oxides and oxidizing mercury in flue gas from a boiler by using an ammonia denitrating catalyst, the air pollution control method comprising:

supplying powdery ammonium chloride from an ammonium chloride supply unit to a location near an entrance of an economizer provided in a flue of a boiler device or to an economizer bypassing unit, or both of them;

sublimating the ammonium chloride in an atmosphere at a temperature of combustion gas at a supply location; and supplying hydrogen chloride and from a hydrogen chloride supply unit and ammonium from an ammonium supply unit into the flue.

\* \* \* \* \*